S. D. McMILLAN.
TICKET STAMP.
APPLICATION FILED AUG. 25, 1921.
1,432,769.
Patented Oct. 24, 1922.
2 SHEETS—SHEET 2.
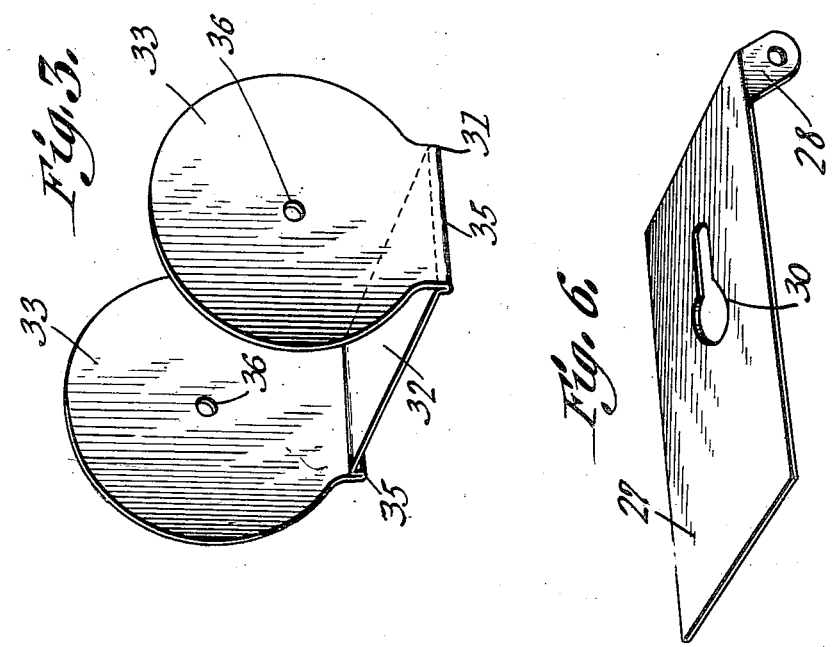
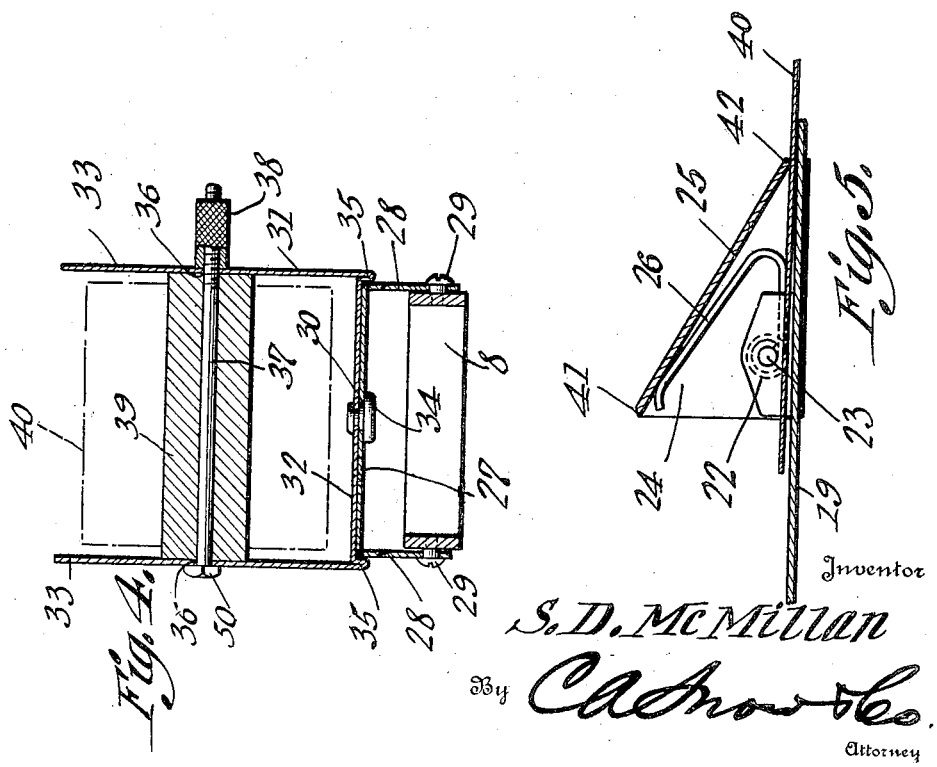
Inventor
S. D. McMillan
By C. A. Snow & Co.
Attorney Patented Oct. 24, 1922.

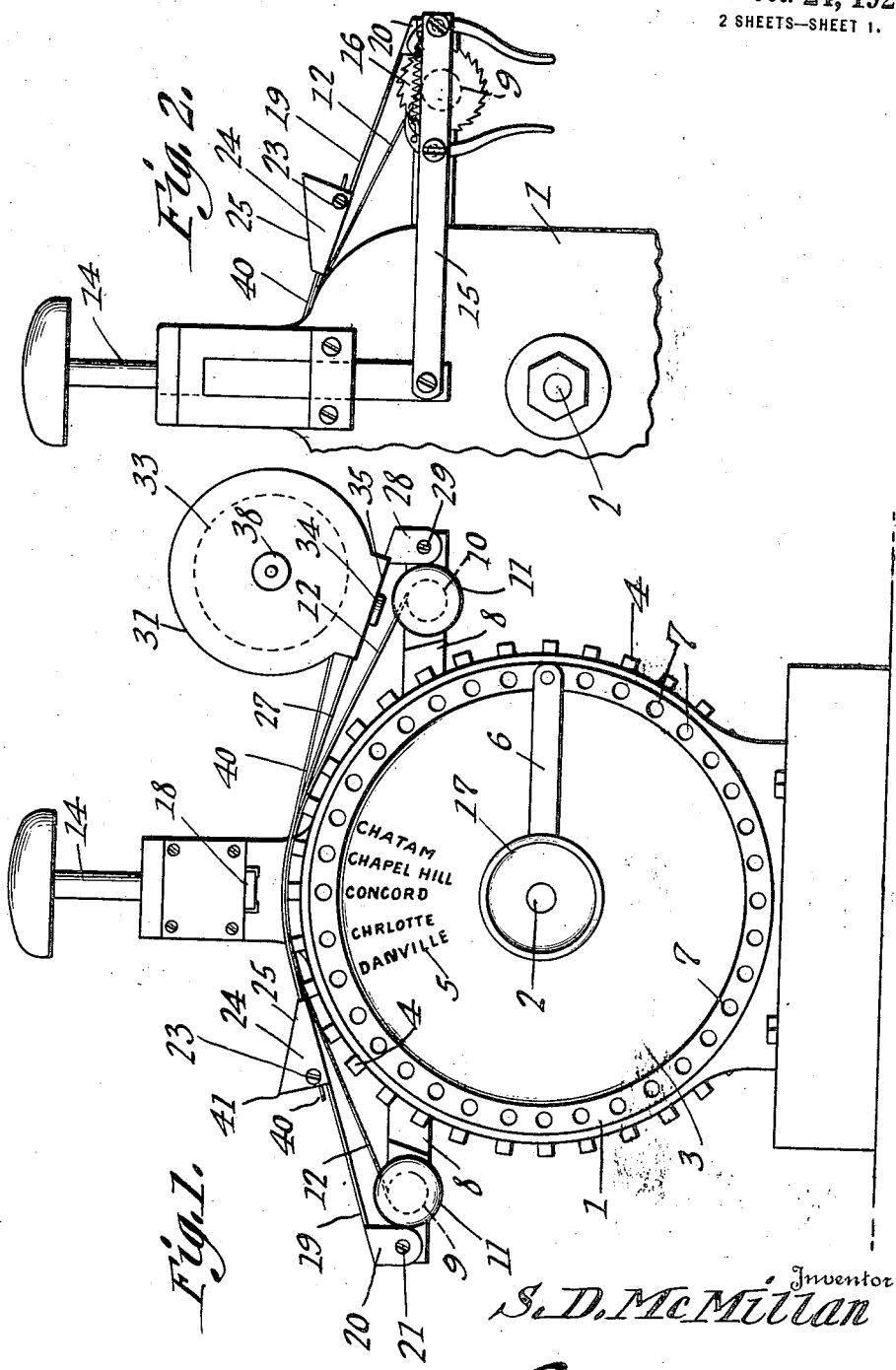

1,432,769

UNITED STATES PATENT OFFICE.

SAMUEL D. McMILLAN, OF LEXINGTON, NORTH CAROLINA.

TICKET STAMP.

Application filed August 25, 1921. Serial No. 495,288.

*To all whom it may concern:*

Be it known that I, SAMUEL D. MC-MILLAN, a citizen of the United States, residing at Lexington, in the county of Davidson and State of North Carolina, have invented a new and useful Ticket Stamp, of which the following is a specification.

The device forming the subject matter of this application is an improvement on the structure shown in my prior Patent No. 1,371,798 issued on the 15th day of March, 1921, and it is the object of the present invention to improve the device shown in the patent by providing means whereby the same may be adapted to handle tickets or the like, which are dispensed from a roll.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in front elevation, a device constructed in accordance with the invention; Figure 2 is a fragmental rear elevation; Figure 3 is a perspective view delineating the frame which carries the roll; Figure 4 is a section taken through the frame of Figure 3; Figure 5 is a section taken through the clip and attendant parts; and Figure 6 is a perspective view showing one of the supports.

In view of the fact that the device forming the subject matter embodies many of the details shown in my patent above alluded to, the description of certain parts of the structure may be shortened accordingly. The numeral 1 indicates a frame wherein a shaft 2 is journaled. The shaft 2 carries a member 3 which is rotatable with the shaft 2 the rotatable member 3 being provided with type bars 4. The names on the type bars are reproduced, as shown at 5, on the forward surface of the rotatable member 3. The shaft 2 carries a spring latch 6 adapted to cooperate with seats 7 on the forward portion of the frame 1.

The shaft 2 has a knob 17 on its forward end, whereby rotation may be imparted to the shaft and to the member 3. The frame 1 includes lateral arms 8. From one of the arms 8, a drum 9 is journaled, a drum 10 being journaled in the other arm. Rotation may be imparted to the drums 9 and 10, by hand, through the instrumentality of buttons 11 connected to the forward ends of the drums. An ink applying element, such as a ribbon 12, is wound about the drums 9 and 10 and passes across those type bars 4 which happen to be adjacent to the top of the rotatable member 3. A plunger 14 is mounted for reciprocation in the upper portion of the frame 1 and is operatively connected at 15 with a feeding mechanism 16 which rotates the drum 9. On the lower end of the plunger 14 there is a platen 18 adapted to cooperate with the ribbon 12 and the particular type bar 4 which is immediately beneath the platen.

The structure above described is shown in my proper patent above identified and the operation thereof is as follows:—

By means of the knob 17, rotation may be imparted to the member 3 and any desired type bar 4, indicated by the appropriate marking at 5, may be brought to the top of the rotatable member 3 immediately below the platen 18. Then, when the plunger 14 is struck downwardly, the ticket or other object to be printed upon being inserted between the platen 18 and the ribbon 12, will be impressed with the legend on the particular type bar 4 which is beneath the platen. The plunger 14, as it reciprocates, imparts rotation to the drum 9 through the instrumentality of the mechanism indicated at 15 and 16 and, thus, the ribbon 12 is carried along, so that a fresh portion of the ribbon is presented to the type bars 4, each time that the plunger 14 moves downwardly.

Passing to the specific improvement which characterize the present invention, it will be noted that a support 19 in the form of a plate is provided, the same having flanges 20 connected by pivot elements 21 with one of the arms 8, the inner end of the support 19 resting on the back part of the main frame. Adjacent to its inner end, the support 19 is supplied with upstanding flanges 22 carrying pivot elements 23 whereon are mounted the depending flanges 24 of a clip or guide 25. A spring 26 is engaged with one of the pivot elements 23 and cooperates with the clip 25 to hold the inner edge 42 of the clip relatively close to the support 19.

A support 27, in the form of a plate, is disposed opposite to the support 19 and has flanges 28 adapted to receive pivot elements 29 mounted in one of the arms 8. The inner end of the support 27 rests on the back part of the frame 1. The support or plate 27 is supplied with a key-hole slot 30.

The device includes an auxiliary frame 31 comprising a base 32 and upstanding resilient wings 33, there being depending flanges 35 at the places where the wings are joined to the base. The base 32 of the auxiliary frame 31 carries a depending headed stud 34, adapted to be received in the key hole slot 30 of the support 27, the base 32 of the auxiliary frame resting on the support, and the flanges 35 engaging the longitudinal edges of the part 27, the auxiliary frame 31 thus being held securely but detachably on the member 27. The wings 33 of the auxiliary frame 31 are supplied with openings 36 receiving a shaft 37 provided at one end with a head 50 engaging one of the wings 33. The other of the wings 33 is engaged by a nut 38 threaded on the shaft 37. The drum 39 is journaled for rotation on the shaft 37 and is located between the wings 33. A strip 40 which may represent a plurality of tickets, is wound around the drum 39, the strip being extended along the ribbon 12 beneath the platen 18 and being extended between the edge 42 of the clip or guide 25 and the support 19.

That portion of the strip 40 which is beneath the platen 18 may be printed upon in the way hereinbefore described. The strip may be advanced after it has been printed, and be torn off across the edge 41 of the member 25. It is possible, therefore to have many tickets, printed in blank, and formed into a roll, each ticket being filled in with the appropriate station name, and by operating the plunger 14, to tear the ticket off as aforesaid, across the edge 41. In case the ticket is composed of two parts, one of which is kept by the station agent, one part of the ticket to be printed upon, the ticket may be advanced until a mark thereon arrives at the edge 41, the stub for the agent then being printed upon, and the ticket being advanced finally until another mark thereon arrives at the edge 41, whereupon the ticket in duplex form may be torn off. The construction of the device is such that it is unnecessary for the station agent to be provided with a large number of tickets representing the various stations on his division or line.

By tightening up the nut 38 on the shaft 37 the wings 33 of the auxiliary frame 31 may be made to bear on the ends of the drum 39 and, thus, the drum may be prevented from rotating too rapidly when the strip 40 is drawn therefrom. The frame 31 constitutes both a support for the drum and a friction brake therefor.

If desired, the supports 27 and 19 may be swung outwardly in opposite directions, thereby exposing the surface of the ribbon and giving access to the ribbon and to the rotatable member 3.

What is claimed is:—

1. In a device of the class described, a main frame; a rotatable typecarrying member journaled thereon; a platen-carrier movable in the frame and cooperating with the type-carrying member, the platen-carrier being located above the type-carrying member; a drum on the frame at one side of the platen-carrier and located adjacent to the upper portion of the type carrying member and a guide on the frame at the opposite side of the platen-carrier, the guide being located adjacent to the upper portion of the type-carrying member, and coacting with the drum, both the drum and the guide being freely accessible from a point above the type-carrying member.

2. In a device of the class described, a main frame; a rotatable type-carrying member journaled thereon; a platen carrier movable in the frame and cooperating with the type-carrying member; a supporting means extended above the upper portion of the type-carrying member; and a drum on the supporting means and located at one side of the platen carrier.

3. In a device of the class described, a main frame; a rotatable type-carrying member journaled thereon; a platen-carrier movable in the frame and cooperating with the typecarrying member; supports pivoted to the frame at their outer ends, and extended toward the platen carrier; a drum mounted on one support and located at one side of the platen carrier; and a guide on the other support and located on the opposite side of the platen carrier.

4. In a device of the class described, a main frame; a rotatable type-carrying member journaled thereon; a platen carrier movable in the frame and cooperating with the typecarrying member; a supporting means mounted on the frame; a drum journaled on the supporting means and located at one side of the platen carrier; and a guide mounted on the supporting means and located on the opposite side of the platen carrier, the guide having a tearing edge for the strip which the drum is adapted to carry both the drum and the guide being located adjacent to the upper portion of the type-carrying member, and being freely accessible from a point above the type-carrying member.

5. In a device of the class described, a main frame; a rotatable type carrying member journaled thereon; a platen carrier movable in the frame and cooperating with the platen carrying member; an auxiliary frame support at one side on the platen carrier and including compressible wings; a drum located between the wings; and means mounted on the wings for carrying the drum and for compressing the wings on the drum thereby to afford a brake.

6. In a device of the class described, a frame; a rotatable type carrying member journaled thereon; a platen carrier movable in the frame and cooperating with the type-carrying member; supports pivoted at their outer ends to the main frame and carried at their inner ends by the main frame; an auxiliary frame; a drum journaled on the auxiliary frame; means for connecting the auxiliary frame detachably to one support; and a spring pressed clip carried by the other strip and coacting with the drum.

In testimony that I claim the foregoing as my own, I have hereto affixed my signature in the presence of two witnesses.

SAMUEL D. McMILLAN.

Witnesses:
 FRED C. SINK,
 W. Z. GREER.